(12) United States Patent
Rossel

(10) Patent No.: US 11,330,816 B1
(45) Date of Patent: May 17, 2022

(54) COMPOSITION FOR KILLING ARTHROPODS AND USES THEREOF

(71) Applicant: Oystershell NV, Merelbeke (BE)

(72) Inventor: Bart Rossel, Merelbeke (BE)

(73) Assignee: Oystershell NV, Merelbeke (BE)

( * ) Notice: Subject to any disclaimer, the term of this patent is extended or adjusted under 35 U.S.C. 154(b) by 0 days.

(21) Appl. No.: 17/108,285

(22) Filed: Dec. 1, 2020

(51) Int. Cl.
*A01N 27/00* (2006.01)
*A01N 55/00* (2006.01)

(52) U.S. Cl.
CPC .............. *A01N 27/00* (2013.01); *A01N 55/00* (2013.01)

(58) Field of Classification Search
CPC ................................ A01N 27/00; A01N 55/00
See application file for complete search history.

(56) References Cited

U.S. PATENT DOCUMENTS

| | | | |
|---|---|---|---|
| 5,271,530 A | 12/1993 | Uehira et al. | |
| 5,443,569 A | 8/1995 | Uehira et al. | |
| 2010/0015064 A1* | 1/2010 | Rossel | A23J 3/346 424/45 |

FOREIGN PATENT DOCUMENTS

| | | |
|---|---|---|
| EP | 1215965 B1 | 12/2003 |
| WO | 2007091882 A1 | 8/2007 |

* cited by examiner

*Primary Examiner* — Yong L Chu

(74) *Attorney, Agent, or Firm* — Vorys, Sater, Seymour and Pease LLP

(57) ABSTRACT

The present invention relates to a composition for killing arthropods and their eggs, such as lice or ticks and nits. More in particular, the invention provides a composition for killing arthropods, said composition comprising at least 65% by weight of a mixture of saturated linear or branched hydrocarbons, wherein said hydrocarbons comprise a mixture of saturated linear or branched $C_{10}$-$C_{16}$ hydrocarbons and saturated linear or branched $C_{17}$-$C_{25}$ hydrocarbons, wherein the ratio of saturated linear or branched $C_{10}$-$C_{16}$ hydrocarbons to saturated linear or branched $C_{17}$-$C_{25}$ hydrocarbons by weight is lower than 15:85. The invention further relates to the use of such composition for killing arthropods and to a method for killing arthropods comprising the application of the present composition.

19 Claims, 2 Drawing Sheets

COMPOSITION FOR KILLING ARTHROPODS AND USES THEREOF

FIELD OF THE INVENTION

This invention relates to a composition for killing arthropods and their eggs. More in particular, the invention provides a composition that essentially comprises hydrocarbons for killing sucking and/or biting lice or ticks and nits. The invention further relates to a hair product comprising a composition according to the invention and a device comprising a composition according to the invention.

BACKGROUND OF THE INVENTION

Parasitic arthropods such as lice or ticks not only are a nuisance, some lice and tick species are important disease vectors. For example, in dogs, *Trichodectes canis* (louse species) can transfer the tape worm *Dipylidium canis*. Human body lice (*Pediculus humanus* humanus) have been identified as the sole carriers of typhus. Ticks (*Ixodidae* spp.) are important vectors of a number of diseases, including for instance the disease of Lyme.

Lice are mobile organisms which are highly adapted to their host species. Many of them only feed on certain areas of their host, e.g. pubic lice (*Phtirus pubis*) in the pubic area, head lice (*Pediculus humanus* capitis) on the scalp and body lice on the rest of the body. Head lice frequently infest human hair and are easily spread by contact, during which mature lice are transferred. Such infestations are particularly prevalent among young, school-going children, because they can spread easily in the associated institutional environment. One female louse can lay hundreds of eggs, starting from 12 days after hatching until its death. The adhesion of these eggs called "nits" to the hair ensures a reservoir of lice and maintains the infestation. Lice are categorized into two Orders: Anoplura (sucking lice) and Mallophaga (biting lice), which have some anatomical/biochemical differences. Human lice belong to the first Order, while the canine lice are of the Mallophaga.

Killing of head lice involves total removal or destruction of both the mature lice and the eggs on each host. Various attempts have been proposed in the prior art to achieve such destruction. It is for instance known that the many commercial hair lice removing compositions kill the parasites by biochemical action. These compositions frequently contain potentially toxic insecticides that, as a general rule, belong to the group that comprises permethrins, decamethrins, pyrethrins, piperonyl butoxide, malathion, DDT, gamexane, lindane etc.

Although effective against lice, such known insecticide compositions present some drawbacks. Some of the above-mentioned chemicals are very persistent in nature (e.g. DDT) and thus widespread use is not warranted. Others can lead to severe (e.g. lindane) or minor (e.g. malathion, pyrethrins) side effects. Malathion and the pyrethrins and permethrins are among the most used insecticides for head lice treatment. However, because of their widespread and continuous some parasites have become resistant to this treatment, which is a reason why the use of these insecticides is associated with treatment failure and low cure-rates. In addition to an increasing lack of efficacy on adult lice, these insecticides are ineffective on nits, requiring at least two successive treatments, with a second treatment meant to kill off hatched nits. Also, the activity of these insecticides varies between the two lice Orders.

Attempts have been made in the prior art to provide compositions that overcome the above-indicated problems related to the use of insecticides. For instance, EP 1 215 965 B1 claims the use of a composition comprising a volatile and a non-volatile siloxane (silicone). In particular, this patent refers to the use of a composition comprising a mixture of linear silicones such as dimethicone and cyclic silicones such as cyclomethicone. Cyclomethicones for instance generally comprise a mixture of cyclotetrasiloxane or octamethylcyclotetrasiloxane (4 silicium atoms) and cyclopentasiloxane or decamethylcyclopentasiloxane (5 silicium atoms).

However, cyclic silicones are known in the art to have toxicity and their use in compositions for treating arthropods on skin or hair could therefore trigger harmful side effects. Reports are for instance known indicating the toxic character, e.g. on the skin, of cyclotetrasiloxanes or cyclopentasiloxane.

Another an important short-coming of existing anti-lice compositions is their low cure-rates, which usually do not exceed about 70%, typically about 50%. This means more than 3 out of 10 persons are not free of lice after two treatments. Such cure-rates are not sufficiently high, especially since only one infested person is needed to re-infest others. In addition, efficacy of the existing anti-lice compositions in killing off nits is extremely low, requiring at least one repetition of the treatment. However, the fact that not all nits hatch at a same time further contributes to low cure rates. Even more, if the composition does not kill off all the lice with the first treatment, some lice can lay eggs in the period between the two treatments. If these new eggs are not killed by an anti-lice compositions on the second treatment, they will hatch after the second treatment leading to treatment failure.

In view of the above, it is clear that there is a need in the art for improving the presently known compositions, mainly the ones used against lice, and specifically the ones that employ insecticides as well as the ones that employ cyclic silicones.

Yet another problem of existing anti-lice compositions is that their formulations are irritating or sensitizing. Existing formulations may cause skin irritation or rashes. In particular, many of the compounds used in existing formulations may cause contact dermatitis. Therefore, there is a further need in the art to provide a non-irritating composition and method for killing arthropods and their eggs.

Yet another, more general, problem of existing anti-lice compositions is that their formulations are not always easy applicable. Existing formulations are not always convenient to application, often requiring extensive shampooing or wetting of hair and scalp. In view hereof, it is clear that there is also a need in the art for an improved composition that is easier to apply, preferably to dry hair, and that more effectively makes contact with arthropods to be killed. It is a further need in the art to provide a safe and effective method for killing arthropod parasites such as ticks and lice. There is yet also a further need in the art to provide a safe and effective method for killing arthropod eggs.

The present invention therefore aims to provide an improved composition, which overcomes at least some of the above-mentioned problems or disadvantages.

In particular, the present invention aims to provide a composition and a method for killing arthropods, including for instance sucking and biting lice and/or ticks, and their eggs, which is non-toxic, and non-irritating.

In addition, the invention aims to provide a composition and method for killing arthropods, and their eggs which is easy to apply and which shows a rapid and definitive effect on the parasites.

SUMMARY

The present invention is directed to a composition for killing arthropods and is based on the finding of the Applicant that compositions comprising the hydrocarbon mixture according to the invention are highly effective in killing arthropods and their eggs, in particular lice and nits.

In a first aspect the present invention therefore relates to a composition for killing arthropods, said composition comprising at least 65% by weight of a mixture of saturated linear or branched hydrocarbons, wherein said hydrocarbons comprise a mixture of saturated linear or branched $C_{10}$-$C_{16}$ hydrocarbons and saturated linear or branched $C_{17}$-$C_{25}$ hydrocarbons, wherein the ratio of saturated linear or branched $C_{10}$-$C_{16}$ hydrocarbons to saturated linear or branched $C_{17}$-$C_{25}$ hydrocarbons by weight is lower than 15:85.

This mixture is non-irritating, highly effective in killing arthropods and their eggs and sufficiently spreadable and rinsable to be effectively applied to a scalp or hair.

In a preferred embodiment, said composition further comprises between 0.01 and 10% by weight of dimethicone having a viscosity of at least 20000 centistokes at 25° C.

In particular, the applicant has shown that a composition comprising a combination of hydrocarbons and high molecular weight siloxanes is effective in killing arthropods and their eggs. Furthermore, the applicant has shown that a well-chosen molecular weight distribution provides a composition which is non-irritating and effective in killing arthropods and their eggs.

The present invention comprises a composition, which is provided as a composition. Preferably, the present composition can be directly applied to dry hair, without shampooing or rinsing with lotion. In another preferred embodiment, the present invention provides a composition, which is a non-aqueous composition. The present composition may further comprise a substituted siloxane polymer, such as: anionic silicones: silicone sulfates, silicone phosphate esters, silicone carboxylates and silicone sulfosuccinates, cationic silicones: silicone alkyl quats (e.g. stearalkonium dimethicone, cetrimonium dimethicone . . . ), silicone amido quats and silicone amidazoline quats, amphoteric silicones: silicone amphoterics and silicone betaines, and nonionic silicones: fluoro silicones, silicone copolyols (or PEGylated silicones), silicone alkanolamides, silicone esters (e.g. dimethicone copolyol avacodoate, dimethicone copolyol almondoate, dimethicone copolyol olivate . . . ), silicone taurines, silicone isethionates, alkylsilicones and silicone glycosides.

The Applicant has surprisingly shown that hydrocarbons and preferably linear and branched hydrocarbons have a killing effect on arthropods and their eggs. In addition, it was shown that the linear siloxane applied in the present composition provides synergetic effects to the composition. Addition of the siloxane to the composition improves the effect of the hydrocarbon: the killing effect of a composition comprising a linear hydrocarbon and a siloxane is better than the killing effect of a composition with no siloxane. Furthermore, it was shown that the siloxane in addition also acts as an agent that is capable of stabilizing the composition, i.e. capable of maintaining the composition in a suitable application form without disintegration of the composition.

An important advantage of providing the present composition in the form of a liquid non-aqueous composition is sufficient rinsability. High molecular weight dimethicone is an oily, viscous substance. A composition comprising high molecular weight dimethicone and high molecular weight hydrocarbons will have issues with respect to spreading the composition onto the scalp and/or hair, as well as rinsing said anhydrous composition from a scalp or hair. The present invention provides a liquid composition which is non-irritating, effective against anthropods as well as sufficiently spreadable and rinsible to be used effectively.

In another embodiment, the composition according to the present invention is foamable. An import advantage of said foam includes an easy application of the composition: the foam can be massaged easily and homogenously on dry hair and the scalp, whereas this is not possible for an oily liquid substance. The latter will seep through the fingers after pouring in a hand and while being applied the substance can run down the scalp into the eyes and neck leading to staining of clothing and possibly eye irritation. In addition, applying a foam ensures a good spreading over the hair and scalp, since the foam has to be rubbed on the surface until it breaks, this also allows a better monitoring of the application so no area is missed.

The present application has further surprisingly shown that the present composition can advantageously be formulated as a stabile foam composition, wherein the linear or branched hydrocarbon is applied as the active ingredient and the siloxane is applied as a foaming agent. It is surprising that the combination of hydrocarbon molecules and large siloxane molecules are able to form a stabile foam.

An important advantage of providing the present composition in the form of a foam includes an easy application of the composition: the foam can be massaged easily and homogenously on dry hair and the scalp. Applying a foam ensures a good spreading over the hair and scalp, since the foam has to be rubbed on the surface until it breaks, this also allows a better monitoring of the application so no area is missed.

In addition, as mentioned above, prior art compositions have low cure rates and require repeated application of the compositions. The present invention provides a solution to this problem by providing a composition, which unlike prior art compositions, is highly effective against arthropods as well as against their eggs.

Thus, the applicant has shown that synergetic effects are obtained when hydrocarbons as defined herein are combined with a linear siloxane as defined herein in a composition according to the invention. In particular such combined use provides a higher killing effect on adult arthropod as well as on their eggs. In addition a composition as defined herein has the capability to form stabile foam. These aspects provide the present composition with important advantages compared to prior art compositions.

In particular, the invention relates to the use of a composition for killing arthropods and their eggs comprising at least 65% by weight of a mixture of saturated linear or branched hydrocarbons, wherein said hydrocarbons comprise a mixture of saturated linear or branched $C_{10}$-$C_{16}$ hydrocarbons and saturated linear or branched $C_{17}$-$C_{25}$ hydrocarbons, wherein the ratio of saturated linear or branched $C_{10}$-$C_{16}$ hydrocarbons to saturated linear or branched $C_{17}$-$C_{25}$ hydrocarbons by weight is lower than 10:90; and said composition comprising between 0.01 and 10% by weight of dimethicone having a viscosity of at least 20000 centistokes at 25° C.

Another advantage of the present composition is that for a given application time it is substantially non-irritating to the skin. To be effective it substantially does not require the use of acetic acid, formic acid or other acidic substances like vinegar, commonly found in commercial and homemade formulations against lice or insecticides. Furthermore, the Applicant found that this particular ratio of saturated linear or branched $C_{10}$-$C_{16}$ hydrocarbons to saturated linear or branched $C_{17}$-$C_{25}$ hydrocarbons by weight is non-irritating. The composition according to the present invention was shown to be non-irritating and sufficiently spreadable and washable to be used on scalp and hair; unlike mixtures of linear or branched $C_{10}$-$C_{25}$ hydrocarbons which do not meet said ratio.

In a preferred embodiment, the invention relates to the use of a composition as defined herein, comprising between 1 and 4% by weight of dimethicone. In another preferred embodiment, the invention relates to the use of a composition as defined herein, wherein said dimethicone has a viscosity of least 40 000 centistokes at 25° C., and preferably of about 60 000 centistokes at 25° C.

In another preferred embodiment, the invention relates to the use of a composition as defined herein comprising from about 65 to 98% by weight, and preferably from about 68 to 97% by weight of said mixture of saturated linear or branched hydrocarbons.

Yet another advantage of the present composition is its effectiveness despite the fact that it contains little or no potentially toxic ingredients known and used in commercial products of this kind, such as pediculicides. The present composition is substantially non-toxic: to be effective, it does not require the use of known potentially toxic agents commonly found in commercial formulations.

The applicant has also shown that the present composition shows a rapid arthropod killing effect. The arthropod can be killed by direct contact with or submergence in the present composition. A composition according to the present invention imparts breathing of the arthropods and can be considered as a suffocating composition; e.g. for lice the present composition is able to block the spiracles. These are small openings on the surface of parasites that lead to the trachea and allow oxygen and moisture exchange with the environment. Preferably, the arthropods that can be killed according to the present invention include insects or arachnids, and preferably are sucking or biting lice.

In another aspect, the present invention provides for the use of a composition as defined herein for killing arthropods and to a method for killing arthropods which comprises applying to said arthropod a composition as defined herein.

The present invention further provides a hair product for killing arthropods and arthropod eggs, wherein said arthropod is an insect or an arachnid, and preferably a sucking or biting louse, comprising a composition according to present invention.

In yet another aspect, the invention provides a device comprising a composition or a hair product according to the invention and means for distribution of said composition or hair product.

The present invention also provides a method for killing arthropods and arthropod eggs, wherein said arthropod is an insect or an arachnid, and preferably a sucking or biting louse, which comprises applying to said arthropod and said arthropod egg a composition as defined herein or a hair product as defined herein.

With the insight to better show the characteristics of the invention, some preferred embodiments and examples are described hereafter referring to the enclosed drawings.

DESCRIPTION OF THE DRAWINGS

FIG. 2 illustrates killing effects of different compositions according to the present invention on lice (*Trichodectes canis*).

DETAILED DESCRIPTION OF THE INVENTION

Figure 1:
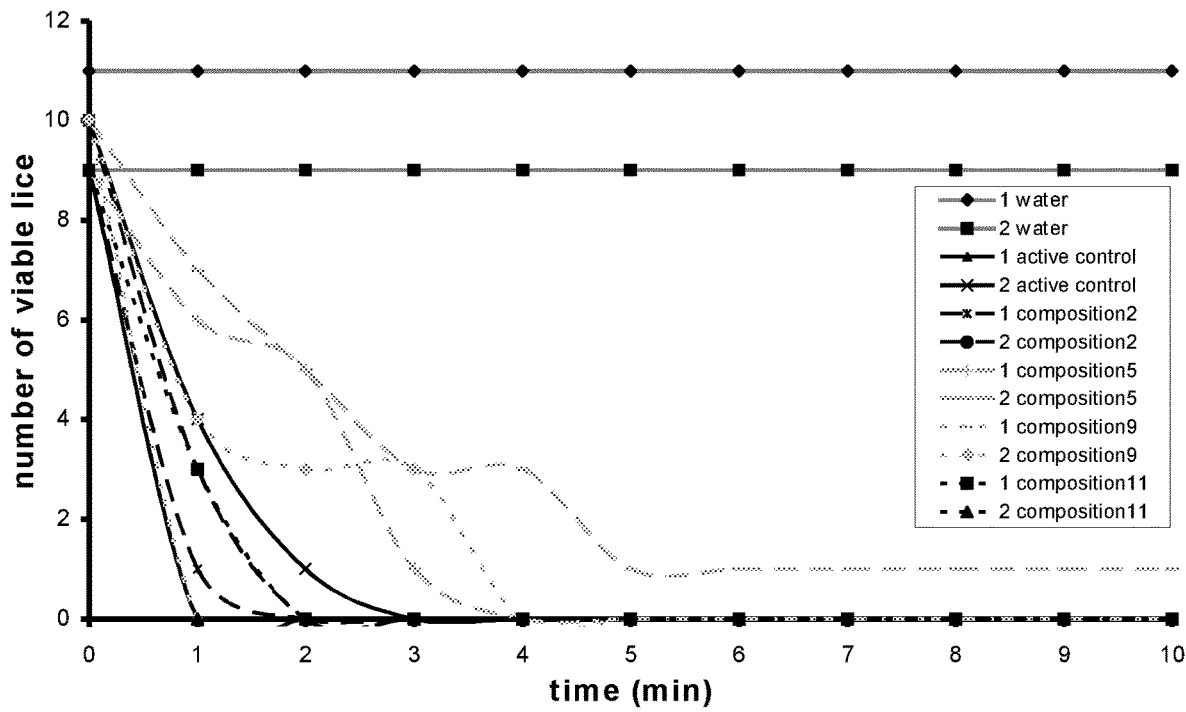
FIG. 1 illustrates the killing effect of different compositions according to the present invention on lice (*Trichodectes canis*).

The present invention is directed to a composition for killing arthropods and their eggs and uses of such compositions in methods for killing arthropods and their eggs. The compositions of the present invention are non-aqueous compositions comprising hydrocarbons and siloxanes. Each of these components is described in detail hereinafter.

The compositions of the present invention can comprise, consist of, or consist essentially of the essential elements and limitations of the invention described herein, as well as any of the additional or optional ingredients, components, or limitations described herein.

All percentages, parts and ratios are based upon the total weight of the present compositions, unless otherwise specified. All such weights as they pertain to listed ingredients are based on the active level and, therefore do not include carriers or by-products that may be included in commercially available materials, unless otherwise specified.

The articles "a" and "an" are used herein to refer to one or to more than one, i.e. to at least one of the grammatical object of the article. By way of example, "a sample" means one sample or more than one sample.

Throughout this application, the term "about" is used to indicate that a value includes the standard deviation of error for the device or method being employed to determine the value.

The recitation of numerical ranges by endpoints includes all integer numbers and, where appropriate, fractions subsumed within that range (e.g. 1 to 5 can include 1, 2, 3, 4 when referring to, for example, a number of samples, and can also include 1.5, 2, 2.75 and 3.80, when referring to, for example, concentrations). The recitation of end points also includes the end point values themselves (e.g. from 1.0 to 5.0 includes both 1.0 and 5.0).

The recitation of hydrocarbons by means of ranges indicating hydrocarbons with a specified number of carbon atoms as endpoints includes all hydrocarbons having an integer number of carbon atoms specified in the range, e.g. "from about $C_{10}$ to about $C_{12}$ carbon atoms" or "$C_{10}$-$C_{12}$ hydrocarbons" are equivalent terms and intend to comprise hydrocarbon having $C_{10}$, $C_{11}$, $C_{12}$ carbon atoms. The recitation of end points also includes the end point values themselves (e.g. from about $C_{10}$ to about $C_{12}$" or "$C_{10}$-$C_{12}$" includes both $C_{10}$ and Cu). The recitation of hydrocarbons with a specified number along with a +, e.g. "$C_{25+}$" indicates the fraction of hydrocarbons with 25 and more carbon atoms. The fraction of hydrocarbons with 25 carbon atoms is included herein). The recitation of hydrocarbons with a specified number along with a −, e.g. "$C_{12-}$" indicates the fraction of hydrocarbons with 12 and less carbon atoms.

Where a percentage is recited in respect of a quantity, it refers to a weight ratio (w/w).

The term "low molecular weight" hydrocarbons as used herein refers to linear or branched hydrocarbons having from 10 to 22 carbon atoms. The term "high molecular weight" siloxanes as used herein refers to linear or branched siloxanes having from 900 to 5.000 silicon atoms. In other words: a molecular weight from 50.000 to 300.000 or a viscosity from 10.000 CS to 1.000.000 CS.

Hydrocarbons

In a preferred embodiment, the present compositions for killing arthropods comprise more than 65% by weight of a mixture of saturated, preferably linear or branched hydrocarbons, and preferably more than 55; 60; 65; 70; 75; 80; 85; 90; 95 or 96% by weight of one or more saturated linear or branched hydrocarbons. For instance, the concentration of hydrocarbons in the present composition may vary from 65 to 99% by weight, preferably from 85 to 98% by weight and even more preferred from 90 to 97% by weight or from 95 to 96% by weight, and for instance 90, 91, 92, 93, 94, 95, 96, 97, 98, or 99% by weight of one or more saturated linear or branched hydrocarbons.

The hydrocarbons for use in the present composition preferably are saturated, straight (linear) chained or branched hydrocarbons. In a preferred embodiment, the hydrocarbons used in the present composition are saturated linear or branched hydrocarbons, having from about 10 to about 25 carbon atoms, more preferably from about 10 to about 22 carbon atoms, more preferably from about 12 to about 22 carbon atoms, more preferably from about 13 to about 22 carbon atoms, more preferably from about 14 to about 22 carbon atoms, more preferably from about 15 to about 22 carbon atoms, more preferably from about 15 to about 22 carbon atoms, more preferably from about 15 to about 22 carbon atoms, most preferably from about 15 to about 22 carbon atoms.

Specific examples of suitable hydrocarbons include, but are not limited to decane, undecane, dodecane, tridecane, tetradecane, pentadecane, hexadecane, heptadecane, octadecane, nonadecane, eicosane, heneicosane, isodecane, isoundecane, isododecane, isotridecane, isotetradecane, isopentadecane, isohexadecane, isoheptadecane, isooctadecane, isononadecane, isoeicosane, isoheneicosane, and/or mixtures thereof. Isoparaffins are branched-chain aliphatic hydrocarbons. The name or C followed by the numbers represents the number of carbons in the hydrocarbon, including the main hydrocarbon chain and the branched alkyl chain.

In yet another embodiment, the composition comprises a mixture of saturated linear or branched $C_{15}$-$C_{19}$ and $C_{18}$-$C_{22}$ hydrocarbons. In yet another embodiment, the invention may relate to a composition comprising a mixture of saturated linear or branched $C_{13}$-$C_{15}$, $C_{16}$-$C_{19}$, and $C_{18}$-$C_{22}$ hydrocarbons.

Preferably, the ratio of saturated linear or branched $C_{10}$-$C_{16}$ hydrocarbons to saturated linear or branched $C_{17}$-$C_{25}$ hydrocarbons in a $C_{10}$-$C_{16}$/$C_{17}$-$C_{25}$ mixture is comprised between 5:95 and 15:85, and for instance 10:90.

In another preferred embodiment, the ratio of saturated linear or branched $C_{10}$-$C_{15}$ hydrocarbons to saturated linear or branched $C_{16}$-$C_{19}$ hydrocarbons in a $C_{10}$-$C_{15}$/$C_{16}$-$C_{19}$ mixture is comprised between 1:100 and 1:10, and for instance 1:20.

In yet another embodiment, the ratio of saturated linear or branched $C_{15}$-$C_{19}$ hydrocarbons to saturated linear or branched $C_{20}$-$C_{25}$ hydrocarbons in a $C_{15}$-$C_{19}$/$C_{20}$-$C_{25}$ mixture is comprised between 2:1 and 1:2, and for instance 1:1.

In still another preferred embodiment, the ratio of saturated linear or branched $C_{10}$-$C_{15}$ to $C_{16}$-$C_{19}$ to $C_{20}$-$C_{25}$ hydrocarbons in a $C_{10}$-$C_{15}$/$C_{16}$-$C_{19}$/$C_{20}$-$C_{25}$ hydrocarbon mixture may be 1:10:10 or 1:20:20 or 1:10:20 or 1:20:10 or 1:10:10, most preferably about 1:20:20.

The inventors have found that the distribution of the saturated linear or branched hydrocarbons in function of the chain length is particularly important. Mixtures with a high amount of short chains, in particular those below $C_{15}$ lead to significant irritation and skin sensitization. However, mixtures with no or insufficient short chains yield a composition that is very difficult to wash out. Consequently these compositions are not suitable for use on hair. The applicant found that mixtures comprising saturated linear or branched hydrocarbons with a well-defined chain length distribution as described herein were foamable, highly effective and non-irritating.

In a particularly preferred embodiment, the invention relates to a composition wherein said hydrocarbons are a mixture of saturated linear and branched hydrocarbons. Preferably the ratio of saturated linear hydrocarbons to saturated branched hydrocarbons is comprised between 1:4 and 2:1, more preferably between 1:4 and 1:1, most preferably between 1:4 and 1:2. These ratios were found to improve the stability of the foam.

In another preferred embodiment, the invention relates to a composition which does not comprise more than 10% by weight of saturated linear or branched $C_{10}$ to $C_{15}$ hydrocarbons, more preferably the composition does not comprise more than 9% by weight of saturated linear or branched $C_{10}$ to $C_{15}$ hydrocarbons, more preferably the composition does not comprise more than 8% by weight of saturated linear or branched $C_{10}$ to $C_{15}$ hydrocarbons, more preferably the composition does not comprise more than 7% by weight of saturated linear or branched $C_{10}$ to $C_{15}$ hydrocarbons, more preferably the composition does not comprise more than 6% by weight of saturated linear or branched $C_{10}$ to $C_{15}$ hydrocarbons, more preferably the composition does not comprise more than 5% by weight of saturated linear or branched $C_{10}$ to $C_{15}$ hydrocarbons, more preferably the composition does not comprise more than 4% by weight of saturated linear or branched $C_{10}$ to $C_{15}$ hydrocarbons, more preferably the composition does not comprise more than 3% by weight of saturated linear or branched $C_{10}$ to $C_{15}$ hydrocarbons, more preferably the composition does not comprise more than 2% by weight of saturated linear or branched $C_{10}$ to $C_{15}$ hydrocarbons, most preferably the composition does not comprise more than 1% by weight of saturated linear or branched $C_{10}$ to $C_{15}$ hydrocarbons. In another preferred embodiment, the invention relates to composition which is substantially free of $C_1$ to $C_{10}$ saturated linear or branched hydrocarbons. Preferably the composition comprises less than 1.000% by weight of $C_1$ to $C_{10}$ hydrocarbons, more preferably the composition comprises less than 0.100% by weight of $C_1$ to $C_{10}$ hydrocarbons, more preferably the composition comprises less than 0.010% by weight of $C_1$ to $C_{10}$ hydrocarbons, most preferably the composition comprises less than 0.001% by weight of $C_1$ to $C_{10}$ hydrocarbons.

In another and more preferred embodiment, the invention relates to a composition wherein said hydrocarbons are a mixture of saturated linear a mixture of saturated linear or branched hydrocarbons selected form the group consisting of $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$ and $C_{25}$ hydrocarbons, and preferably from 0.0 to 15.0% by weight $C_{10}$, $C_{11}$, $C_{12}$, $C_{13}$, $C_{14}$, and/or $C_{15}$ hydrocarbons, preferably from 0.0 to 10.0% by weight $C_{10}$, $C_{11}$, $C_{12}$, $C_{13}$, $C_{14}$, and/or $C_{15}$ hydrocarbons and more preferably less than 9.0% by weight $C_{10}$, $C_{11}$, $C_{12}$, $C_{13}$, $C_{14}$, and/or $C_{15}$ hydrocarbons, and more preferably less than 8.0% by weight $C_{10}$, $C_{11}$, $C_{12}$, $C_{13}$, $C_{14}$, and/or $C_{15}$ hydrocarbons, and more preferably less than 7.0% by weight $C_{10}$, $C_{11}$, $C_{12}$, $C_{13}$, $C_{14}$, and/or $C_{15}$ hydrocarbons, and more preferably less than 6.0% by weight $C_{10}$, $C_{11}$, $C_{12}$, $C_{13}$, $C_{14}$, and/or $C_{15}$ hydrocarbons, and more preferably less than 5.0% by weight $C_{10}$, $C_{11}$, $C_{12}$, $C_{13}$, $C_{14}$, and/or $C_{15}$ hydrocarbons, and more preferably less than 4.0% by weight $C_{10}$, $C_{11}$, $C_{12}$, $C_{13}$, $C_{14}$, and/or $C_{15}$ hydrocarbons, and more preferably less than 3.0% by weight $C_{10}$, $C_{11}$, $C_{12}$, $C_{13}$, $C_{14}$, and/or $C_{15}$ hydrocarbons, and more preferably less than 2.5% by weight $C_{10}$, $C_{11}$, $C_{12}$, $C_{13}$, $C_{14}$, and/or $C_{15}$ hydrocarbons, and most preferably less than 2% by weight $C_{10}$, $C_{11}$, $C_{12}$, $C_{13}$, $C_{14}$, and/or $C_{15}$ hydrocarbons, and from 0 to 20% by weight $C_{16}$ hydrocarbons, preferably from 1 to 15% by weight $C_{16}$ hydrocarbons and more preferably from 1 to 10% by weight $C_{16}$ hydrocarbons, more preferably from 2 to 8% by weight $C_{16}$ hydrocarbons, more preferably from 3 to 7% by weight $C_{16}$ hydrocarbons, more preferably about 5% by weight $C_{16}$ hydrocarbons, from 0 to 30% by weight $C_{17}$ hydrocarbons, preferably from 1 to 20% by weight $C_{17}$ hydrocarbons and more preferably from 5 to 15% by weight $C_{17}$ hydrocarbons, most preferably about 10% by weight $C_{17}$ hydrocarbons, from 0 to 30% by weight $C_{18}$ hydrocarbons, preferably from 1 to 20% by weight $C_{18}$ hydrocarbons and more preferably from 5 to 15% by weight $C_{18}$ hydrocarbons, most preferably about 12% by weight $C_{18}$ hydrocarbons, from 0 to 30% by weight $C_{19}$ hydrocarbons, preferably from 1 to 20% by weight $C_{19}$ hydrocarbons and more preferably from 5 to 20% by weight $C_{19}$ hydrocarbons, and/or more preferably from 10 to 20% by weight $C_{19}$ hydrocarbons, most preferably about 16% by weight $C_{19}$ hydrocarbons, from 0 to 70% by weight $C_{20+}$ hydrocarbons, preferably from 20 to 65% by weight $C_{20+}$ hydrocarbons and more preferably from 30 to 60% by weight $C_{20+}$ hydrocarbons, and more preferably from 40 to 60% by weight $C_{20+}$ hydrocarbons, most preferably about 55% by weight $C_{20+}$ hydrocarbons Siloxanes In another preferred embodiment, the present composition for killing arthropods comprises one or more (poly)siloxanes, preferably linear or branched polysiloxanes. It is noted that in the present invention, for avoidance of doubt, the term "siloxane" or "polysiloxanes" are used as synonyms and are used herein is intended to encompass silicones.

In a preferred embodiment, the linear siloxanes applied in the present compositions include non-volatile siloxanes. For the purposes of this application the term "non-volatile" is taken to mean that the siloxane exhibits very low or no significant vapor pressure at ambient conditions, e.g., 0.60 mm Hg at 20°. The non-volatile siloxane preferably has a boiling point at ambient pressure of above about 170° C., preferably of above about 200° C., and more preferably of above about 250° C.

It will be understood that viscosity can be expressed as absolute viscosity, which is measured in poises ($gsec^{-1}$ $cm^{-1}$) or centipoises, or as kinematic viscosity. Kinematic viscosity is the ratio of viscosity to density and is measured in stokes or centistokes. For convenience, viscosity will herein be expressed in centistokes unless otherwise stated. In a preferred embodiment, the non-volatile linear siloxanes for use herein preferably have a viscosity of at least 10000, preferably at least 20000 centistokes at 25° C., and more preferably of at least 30000, 40000, 50000, 60000 centistokes. In a preferred embodiment, the non-volatile linear siloxanes for use herein preferably have a viscosity of at most 1 000 000 centistokes at 25° C., more preferably at most 600000 CS, more preferably at most 500000 CS, more preferably at most 400000 CS, more preferably at most 300000 CS, more preferably at most 200000 CS, more preferably at most 100000 CS, most preferably about 60.000 centistokes at 25° C. The viscosity can be measured by means of a glass capillary viscometer. The technique for measuring kinematic viscosity is well known in the art and will therefore not be described herein. Dimethicone with these chain lengths and viscosity was found to be the most effective against lice and their nits. Further increasing the viscosity lead to issues to properly apply and spread the composition, thereby reducing its effectiveness in practice.

In another preferred embodiment, the present composition comprises between 0.01 and 50% and preferably between 0.01 and 20% by weight, more preferably between 0.1 and 10% by weight and most preferably between 1 and 4%, by weight and for instance 1, 1.5, 2, 2.5, 3, 3.5, or 4% by weight of said siloxanes.

Suitable siloxanes preferably include polyalkyl siloxanes, polyaryl siloxanes, polyalkylaryl siloxanes, or any mixtures thereof. The siloxanes herein may thus include polyalkyl or polyaryl siloxanes with the following structure as shown in FORMULA I:

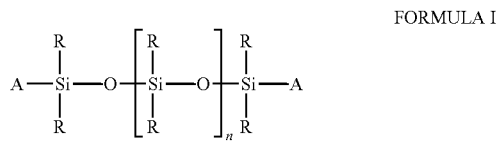

FORMULA I wherein

R substituents are independently chosen from the group comprising alkyl or aryl, n is an integer from about 1 to 15000, and preferably from 10 to about 10000 and most preferably from 1000 to 5000, "A" represents groups which block the ends of the siloxane chains, and preferably are selected from the group comprising hydroxy, methyl, methoxy, ethoxy, propoxy, and aryloxy.

The term "alkyl" by itself or as part of another substituent, refers to a straight or branched saturated hydrocarbon group joined by single carbon-carbon bonds having 1 to 20 carbon atoms, for example 1 to 10 carbon atoms, for example 1 to 8 carbon atoms, preferably 1 to 6 carbon atoms, more preferably 1, 2, 3 or 4 carbon atoms. Examples of alkyl groups are methyl, ethyl, propyl, isopropyl, butyl, isobutyl, sec-butyl, tert-butyl, 2-methylbutyl, pentyl iso-amyl and its isomers, hexyl and its isomers, heptyl and its isomers and octyl and its isomer.

The term "aryl" as used herein by itself or as part of another group refers but is not limited to 5 to 24 carbon-atom homocyclic (i.e., hydrocarbon) monocyclic, bicyclic or tricyclic aromatic rings or ring systems containing 1 to 4 rings which are fused together or linked covalently, typically containing 5 to 8 atoms; at least one of which is aromatic.

The aromatic ring may optionally include one to three additional rings (either cycloalkyl, heterocyclyl or heteroaryl) fused thereto.

The alkyl or aryl groups substituted on the siloxane chain (R) or at the ends of the siloxane chains (A) can have any structure as long as the resulting siloxane remains fluid at room temperature, is neither irritating, toxic nor otherwise harmful when applied to, is compatible with the other components of the composition, and is chemically stable under normal use and storage conditions. The two R groups on the silicon atom, and the two A groups may represent the same group or different groups. Preferably, the two R groups and the two A groups represent the same group.

Particularly suitable R groups include methyl, ethyl, propyl, phenyl, methylphenyl and phenylmethyl. The preferred silixanes are polydimethylsiloxane, polydiethylsiloxane, and polymethylphenylsiloxane. Polydimethylsiloxane, which is also known as dimethicone, is especially preferred. The polyalkylsiloxanes that can be used include, for example, polydimethylsiloxanes. Polyalkylaryl siloxanes can also be used and include, for example, polymethylphenylsiloxanes. These silixanes are commercially available, e.g. from Dow Corning.

In a particularly preferred embodiment, the invention provides a composition comprising between 0.01 and 50% and preferably between 0.01 and 20% by weight, more preferably between 0.1 and 10% by weight and most preferably between 1 and 4% by weight, and for instance 1, 1.5, 2, 2.5, 3, 3.5, or 4% by weight of dimethicone, preferably dimethicone having a viscosity of at least 20000 centistokes at 25° C., and more preferably of at least 40000, or even about 60000 centistokes at 25° C. With the term "about" is meant a standard deviation of 15% on the viscosity value.

Substituted Silicone Co-Polymer

In another embodiment, the invention relates to a composition for killing arthropods that further comprises a substituted siloxane polymer.

The term "substituted siloxane polymer" as used herein, refers to a siloxane polymer having formula I given above, wherein one or more R groups have further functional groups attached to the carbon atom. These functional groups may comprise but are not limited to: one or more alkenyl, alkynyl, carboxyl, hydroxy, acrylate, ester, ether, alkoxy, halogen, cyano, mercapto, amino and carbohydrate groups. The substituents contained in R may be neutral or contain cationic centres such as quaternary ammonium or anionic centers such as sulphonic acid or thiosulfate groups.

In a preferred embodiment, the invention provides a composition comprising between 0.1 and 4% by weight, and for instance comprising 0.5; 0.75; 1; 1.25; 1.5; or 1.75% by weight of said substituted siloxane polymer.

In a preferred embodiment, the substituted siloxane polymer is a quaternary silicone co-polymer. Quaternary silicone polymers include silicone polymers, which contain a quaternary nitrogen pendant group. Preferably, quaternary silicone co-polymers applied in a composition of the present invention are represented by FORMULA II:

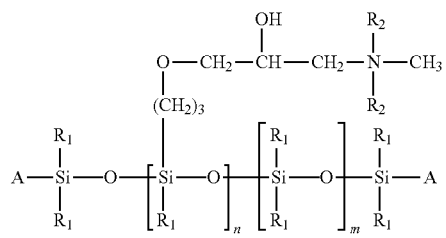

FORMULA II wherein $R_1$ has the same meaning as R given for formula I, and wherein $R_1$ preferably is preferably methyl, wherein A and n have the same meaning as given for formula I, and wherein A preferably is methyl, wherein m is chosen such that the sum of m and n lies between 2 and 15000 wherein $R_2$ is alkyl as defined above, and preferably methyl.

Quaternary silicone co-polymers are commercially available from Siltech Inc., under the tradename SILQUAT.

In another preferred embodiment, the substituted siloxane polymer is a perfluoro silicone co-polymer. Perfluoro silicone co-polymer refer to fluor-containing silicone compounds in which all hydrogen atoms, except those whose replacement would affect the nature of characteristic groups present, have been replaced by fluor atoms in the silicone compounds. Preferably, perfluoro silicone co-polymers applied in a composition of the present invention, are represented by FORMULA III:

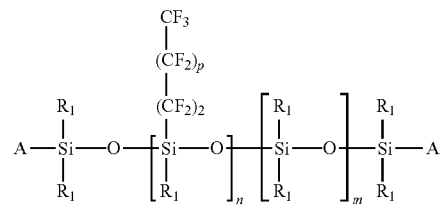

FORMULA III wherein $R_1$ has the same meaning as R given for formula I, and wherein $R_1$ preferably is preferably methyl, wherein A and n have the same meaning as given for formula I, and wherein A preferably is methyl, wherein m is chosen such that m+n is equal to or up to about 15000, wherein p is an integer from about 2 to 5, and wherein F is fluor.

Perfluoro silicone co-polymers are for example perfluorononyl dimethicone and e.g. commercially available from Siltech Inc., under the tradename FLUOROSIL.

Optional Components

In addition to the essential components described hereinbefore, the present compositions may further comprise one or more optional components that are known or otherwise suitable for use on human/animal hair or skin. Non-limiting examples of such optional components include for instance a foaming agent, plasticisers and humectants (such as glycerol, propane-1,2-diol, polypropylene glycol and other polyhydric alcohols), free radical scavengers, viscosity-adjusting agents, dyes and colorants, perfumes, and the like. In a preferred embodiment, the present composition further comprises a foaming agent. Foaming agents are agents, which promote the formation of the foam. Any agent having a surfactant character may be used. The surfactants may be cationic, non-ionic or anionic. Examples of suitable foaming agents include, but are not limited to cetrimide, lecithin, soaps, and the like, and for instance, Anionic (based on sulfate, sulfonate or carboxylate anions): Sodium dodecyl sulfate (SDS), ammonium lauryl sulfate, and other alkyl sulfate salts, Sodium laureth sulfate, also known as sodium lauryl ether sulfate (SLES), Alkyl benzene sulfonate Soaps, or fatty acid salts (see acid salts)

Cationic (based on quaternary ammonium cations): Cetyl trimethylammonium bromide (CTAB) a.k.a. hexadecyl trimethyl ammonium bromide, and other alkyltrimethylammonium salts, Cetylpyridinium chloride (CPC), Polyethoxylated tallow amine (POEA), Benzalkonium chloride (BAC), Benzethonium chloride (BZT)

Zwitterionic (amphoteric): Dodecyl betaine, Dodecyl dimethylamine oxide, Cocamidopropyl betaine, Coco ampho glycinate Nonionic: Alkyl poly(ethylene oxide), Alkyl polyglucosides, including: Octyl glucoside, Decyl maltoside, Fatty alcohols, Cetyl alcohol, Oleyl alcohol. Commercially available surfactants such as Tween™ are also suitable.

Formulation

It was shown by the Applicant that the present composition comprising linear hydrocarbons can be formulated as a stable composition. Similarly the composition comprising linear hydrocarbons and one or more linear siloxanes can be formulated as a stable composition.

In an embodiment according to the present invention, the composition is preferably in the form of a liquid composition, e.g. a solution. However, it needs to be noted that compositions according to the present invention are non-aqueous compositions, which do not comprise an aqueous carrier, such as water.

In a preferred embodiment, the liquid composition according to the present invention may be removed by rinsing with water. An issue with dimethicone with high viscosity is that it is difficult to apply and remove from skin and hair. In particular it does not rinse off or wash out well. The present invention offers a liquid, non-aqueous composition which is sufficiently spreadable to be applied to skin and hair effectively. Increasing the chain length of the hydrocarbon mixture leads to a composition which cannot be applied and/or removed effectively; thereby diminishing its activity in practice.

In another embodiment, the composition the present composition comprising linear hydrocarbons and one or more linear siloxanes can be formulated as a foamable composition, forming a stable foam.

The term "foamable" as used herein refers to a composition that is capable of forming a foam as a result of a foaming process. Such foaming process may involve the forcing of a gas into or within the composition to entrap small bubbles of gas therein, thereby forming the foam. In certain embodiments of the present invention, the terms "foam" and "foamable" are used interchangeably.

Foam is a voluminous mixture of gasbubbles in liquid which will gradually collapse into gas and liquid. The stability of foam can be defined by means of the time period wherein foam keeps a voluminous form, i.e. before collapsing into liquid and gas. In accordance with the present invention, the term "stabile" foam means that the time period wherein the present foam maintains at least 90% of its original volume is more than 1 seconds, and preferably more than 2, 3, 4, 5, 6, 7, 8, 9, 10, 15, 20, 25, 30, 35, 40, 45, 50, 55, or 60 seconds.

Prior to the foaming process, the present composition is preferably in the form of a liquid composition, e.g. a solution. However, it needs to be noted that compositions according to the present invention are non-aqueous compositions, which do not comprise an aqueous carrier, such as water.

The compositions of the present invention can be prepared by using conventional mixing and formulating techniques.

In the present foamable composition or foam composition, the linear hydrocarbon is applied as the active ingredient and the siloxane is applied as a foaming agent. In view thereof, in another embodiment the invention also relates to the use of a linear siloxane as defined herein as a foaming agent. To our knowledge, there is no indication in the prior art that the linear siloxanes themselves have any foaming effect. On the contrary, siloxanes are known to be used in the prior art for their defoaming effect.

In the present foamable composition or foam composition, the mixture of saturated linear and branched hydrocarbons wherein the ratio of saturated linear or branched $C_{10}$-$C_{16}$ hydrocarbons to saturated linear or branched $C_{17}$-$C_{25}$ hydrocarbons by weight is lower than 15:85 allows formation of a foam. This is remarkable as a composition consisting of 96% saturated linear $C_{16}$ hydrocarbons and 4% dimethicone is not foamable.

The present composition is applied to the body site of interest in the form of a foam and it is therefore essential that the composition undergoes a foaming process before application to the body. In the foaming process, gas is forced into or is formed within the formulation to entrap small bubbles of gas therein, thereby forming the foam. Any suitable gas or gas producing system can be used to produce the foam. Mention may be made of butane and nitrous oxide, but other gases like air, nitrogen, hydrofluorocarbons, hydrocarbons like propane, isopropane or a mixture thereof, are also suitable. Preferably, the foam is produced by using air.

By using foam for the administration, a composition according to the invention can be applied in an easier and more effective way onto a treatment area. Where prior art compositions in the form of a solution usually result in an uneven application to a small area, the viscosity and adhesive properties of a foaming composition as defined herein enable an even spreading over a larger surface area. Using foam as delivery system for a composition as defined herein therefore results in a more efficient treatment. Compared to a shampoo, foam has the advantage that the treatment can last for a longer time. After washing a shampoo is rinsed away, while foam can be left on the treated area for about 5 minutes to 8 hours.

The occurrence of eye irritation is greater when using a shampoo compared to a foam. Furthermore, the occurrence of eye irritation is greater when using a foam compared to a lotion. The liquid composition according to the present invention showed the highest safety with respect to eye irritation.

The applicant has shown that synergetic effects are obtained when hydrocarbons are combined with a linear siloxane as defined herein in a composition according to the invention.

The applicant found that the combination of one or more hydrocarbons with a linear siloxane as defined herein acts synergistically against arthropods when locally applied, particularly by way of a foamable composition. The effect of the combination is a significant killing effect on living arthropods such as lice, and eggs thereof. Therefore, administration of the combination of one or more hydrocarbons as defined herein and a linear siloxane as defined herein provides an effective treatment against arthropods and their eggs, such as e.g. lice, including nits. The synergistic effect refers to a greater-than-additive effect which is produced by a combination of two components, and which exceeds that which would otherwise result from individual administration of either component alone. Administration of one or more hydrocarbons as defined herein in combination with a linear siloxane as defined herein unexpectedly results in a synergistic effect by providing greater efficacy than would result from use of either of the agents alone, in particular by more rapidly killing more arthropods and their nits and by providing higher cure rates. The linear siloxane as defined herein enhances the hydrocarbon's effects.

The applicant showed that applying a composition according to the present invention provides faster killing and permits to kill a higher number of arthropods such as lice. In particular, a composition as defined herein is typically able to kill live lice more than two times faster, preferably more than three times faster and more preferably more than four times faster, than compositions known in the prior art. The foam forming capacity of the composition improves the way of application and advantageously contributes to the improved effectiveness of the composition.

Compared to the present compositions, prior art compositions comprising hydrocarbons but no siloxane have reduced killing effects, especially with regard to time required to kill as well as number of killed lice. While on the other hand, prior art compositions comprising siloxane but no hydrocarbons can not be used, since such compositions have characteristics, in particular a high viscosity, which makes their application unfeasible.

Moreover, the applicant has shown that a composition according to the invention wherein one or more hydrocarbons as defined herein are combined with a linear siloxane as defined herein provide a foam, while a composition comprising no siloxane or a composition comprising no hydrocarbons does not result in a usable or applicable foamable composition (see also above).

In another embodiment, the invention relates to a hair product for killing arthropods and their eggs, wherein said arthropod is an insect or an arachnid, and preferably a sucking or biting louse, comprising a composition as defined herein. The term "hair product" as used herein refers to a product applied for the maintenance of hair hygiene. The present hair product may be suitable for human or animal use.

In addition to the above-mentioned hydrocarbons, siloxanes and optionally substituted siloxane polymers, hair products may preferably further comprise a number of additives including but not limited to moisturizers, pH regulators, dyes, colorants, UV absorbers, fragrances, softening agents, preservatives, antibacterials and antimicrobials. Such additives are well known in the art and will not be disclosed in detail herein.

The present invention provides a composition and hair product which is highly effective against arthropods as well as against their eggs. The present composition and product provide high cure rates and high killing efficiencies.

The term "cure rate" is used herein to refer to the amount (in %) of persons in a group treated with said composition that are free of living arthropods after treatment. A cure rate of 70% means that 7 out of 10 treated persons are free of living arthropods after treatment. The present composition provides a cure rate in vivo of more than 70% after only one treatment, where other anti-lice treatments need at least two treatments to obtain a cure rate of about 70%. The present composition is characterized in that it provides a cure rate of more than 70%, and preferably of at least 75, 80, 85, 90, 95, or even of 100%.

The term "killing efficiency for arthropods" is used herein to refer to the amount (in %) of arthropods that are killed after one treatment with a composition or product as defined herein. A killing efficiency of 70% means that 7 of 10 arthropods are killed after one treatment. The present composition provides a killing efficiency for arthropods of more than 70%, and preferably of at least 75%, more preferably of at least 80, 85, 90, 95, or even 100%.

The term "killing efficiency for arthropod eggs" is used herein to refer to the amount (in %) of arthropod eggs that are killed after one treatment with a composition or product as defined herein. A killing efficiency for arthropod eggs of 70% means that 7 of 10 arthropod eggs are killed after one treatment and will therefore not hatch. The present composition provides a killing efficiency for arthropod eggs of more than 70%, and preferably of at least 75%, more preferably of at least 80, 85, 90, 95, or even 100%. Compared to the present composition, prior art compositions have a negligible effect on nits, while the present composition may even have a 100% ovicidal efficacy, i.e. a 100% killing efficiency on nits, which are also called ova.

In other words, present invention relates to the use of a composition as defined herein whereby a killing efficiency for said arthropods is obtained of at least 70%, and preferably of at least 75, 80, 85, 90, 95, or even 100%. The invention also contemplates the use of a composition as defined herein whereby a cure-rate is obtained of at least 70%, and preferably of at least 75, 80, 85, 90, 95, or even 100%. The present invention also relates to the use of a composition as defined herein for killing arthropod eggs, whereby in particular a killing efficiency for said arthropod eggs is obtained of at least 70%, and preferably of at least 75, 80, 85, 90, 95, or even 100%.

The present invention further provides a method for killing arthropods and arthropod eggs, wherein said arthropod is an insect or an arachnid, and preferably a sucking or biting louse, which comprises applying to said arthropod and/or said arthropod egg a composition as defined herein or a hair product as defined herein. In particular a method for killing arthropods and arthropod eggs is provided whereby said arthropods and arthropod eggs are killed at a killing efficiency for said arthropods of at least 70%, and preferably of at least 75, 80, 85, 90, 95, or even 100%, and for said arthropod of at least 70%, and preferably of at least 75, 80, 85, 90, 95, or even 100% in a single treatment step by applying to said arthropod and said arthropod egg a composition or a hair product as defined herein.

Device

The invention further relates to a device comprising a foamable composition according to the invention. Preferably the device comprises a container for containing the composition, means for forming a foam and optionally a cover and optionally a cover such as a transparent cover. The composition may be present in the container in an uncompressed or compressed state.

The present composition may be stored in any convenient container until required. Conveniently, the container will be provided with means to foam the composition when required. Preferably, the container used in accordance with the present invention to dispense the composition in a foam formulation comprises means for forming a foam such as e.g. a foam pump dispenser, including a mesh screen, that mixes the (liquid) composition with air to produce the foam, or equivalent means.

The foam-dispensing devices and their mode of action are generally known per se. For a description of further details of such devices and their action for forming foam, reference is made, for example, to WO 2007/091882, U.S. Pat. Nos. 5,271,530 and 5,443,569, which are incorporated herein by reference, which documents are hereby incorporated in this application by way of reference. A skilled person would readily know which type of foam-dispensing pumping device can be used in accordance with the present invention. Therefore, foam-dispensing pumping devices will not be discussed into more detail herein.

Use of the Composition

In accordance with the present invention, the compositions as defined herein are used for killing arthropods and their eggs. The term "killing" as used herein includes repelling, reducing in number, and eradicating said arthropods, e.g. ectoparasites, and/or their eggs. Use of the present compositions for killing arthropods and/or their eggs includes prophylactic use.

The compositions according to the present invention are useful in the killing of arthropods, particularly terrestrial arthropods, especially insects and arachnids, and their eggs. Insects include ectoparasites. In particular, said compositions have pediculicidal activity, and are therefore especially useful for treating infestations of lice in animals, including humans.

Ectoparasites include sucking and biting lice, fleas, keds, mites and ticks.

Sucking lice (Anoplura) and biting lice (Mallophaga) are parasites found on nearly all groups of mammals, and include *Haematopinus* spp., *Linognathus* spp., *Solenopotes* spp., *Pediculus* spp., and *Pthirus* spp. *Pediculus* spp. include *Pediculus humanus,* e.g. the head louse *Pediculus humanus* capitis and the body or clothing louse *Pediculus humanus humanus*. *Pthirus* spp. includes the crab louse *Pthirus pubis*.

Ticks are the largest group of the subclass Acari and are obligate blood-sucking ectoparasites of land vertebrates. Certain species are pests of domestic livestock, while another group transmits human disease. Ticks are classified into three families, all but one species belonging to the *Ixodidae* (hard ticks) for to the *Argasidae* (soft ticks). The present compositions can be used to kill soft as well as hard ticks.

The present compositions are also useful for the control of other terrestrial arthropods, including for example public health pests e.g. cockroaches and bed bugs; nuisance arthropods e.g. wasps, ants, silver fish and woodlice; and structural pests e.g. furniture beetles, deathwatch beetles and other wood borers.

Arthropod eggs include eggs of ectoparasites as defined herein and include but are not limited to eggs of sucking and biting lice-also called nits or ova-, eggs of fleas, keds, mites and ticks.

Preferably the composition is used for treatment of hair, thus for hair care. Hair care products according to the present invention can be used in conventional ways and generally involve the application of an effective amount of the hair product onto the hair, preferably on dry hair. The composition is left in/on the hair for about 5 minutes to 8 hours and is subsequently removed by rinsing and washing the hair extensively. The composition is distributed throughout the hair, typically by rubbing or massaging the hair and scalp with ones' hands or by another's hands. An effective amount of the composition, typically from about 1 gram to about 100 grams, preferably from about 10 gram to about 30 grams, is applied.

Method of Use

The compositions of the present invention may be used in a conventional manner. Generally, the formulation of the present invention will be applied directly to the body site of interest in the form of a liquid composition or a foam, in case of a foam this foam being produced from any suitable device immediately before application. It is, however, possible for a quantity of the formulation to be produced and then applied onto the body site by any suitable means, for example by hand or by spatula.

An effective amount of the composition, typically from about 1 gram to about 200 grams, for instance from about 30 gram to about 150 grams or from about 1 gram to about 100 grams, or from about 10 grams to about 30 grams is applied.

The method for treating hair for instance comprises the steps of: (a) applying an effective amount of the composition to the hair, (b) working the composition in contact with the hair, (c) leaving the composition on the hair for a suitable period of time to allow killing to occur and (d) rinsing the composition from the hair using water. Application of the composition to the hair typically includes working the composition through the hair, generally with the hands and fingers. The composition is left into contact with the hair, e.g. for about 5 or 10 minutes to 8 hours. The composition is then rinsed from the hair with water and optionally soap (e.g. a shampoo).

The method for treating the skin for instance comprises the steps of: (a) applying an effective amount of the composition to the skin, (b) leaving the composition on the skin for a suitable period of time to allow killing to occur and (c) rinsing the composition from the skin using water. The composition can be left into contact with the skin, e.g. for about 5 or 10 minutes to 8 hours. The composition is then rinsed from the skin with water and optionally soap.

The method steps can be repeated as many times as desired to achieve the sought effects. But preferably the treatment is repeated after 7 days. To kill off the hatched lice that were not killed in the first treatment.

EXAMPLES

Example 1: In Vitro Screening of Compositions According to the Present Invention for Efficacy Against Lice The present invention reports the screening of compositions according to the invention formulations for activity against lice (*Trichodectes canis*) in vitro.

In this experiment, the compositions screened were developed to have an impact on the breathing of the lice. These compositions were developed to have a quick impact on human lice infestations. Given the difficulty of working with human lice (safety), dog lice were used in this experiment. Both lice Orders (Anoplura (sucking lice) and Mallophaga (biting lice)) have the same breathing mechanisms. Therefore, it is accepted that the impact of a suffocating composition (i.e. a composition that blocks the spiracles of the parasites) is the same for both Orders.

Four trials were conducted using a non-active control (water), an active control, and different compositions (4 in each experiment, with 2 repeated). The used compositions are depicted in TABLE 1. The active control consisted of a composition comprising 96 wt % of cyclomethicone and 4 wt % of dimethicone, but no hydrocarbons.

Trials 1 and 2 consisted of submergence tests. In Trial 1, efficacy was determined by submerging the lice in the controls/compositions. In the first run of this trial lice were exposed for approximately 30 seconds, while in the second run exposure was approximately 10 seconds. Trial 2 the lice were submerged for approx 10 seconds after which they were rinsed with water to remove the remaining formulation. Trial 2 was run in duplicate.

Trials 3 and 4 consisted of contact tests. In Trials 3 and 4, efficacy was determined by contact to filter paper that was saturated with the controls/compositions.

In all Trials, the water control was run in duplicate, with the water control being the first and last substance tested to ensure no cross-contamination had occurred.

Material and Methods

Lice

For all Trials, lice (*Trichodectes canis*) were collected from an infested dog within 24 h of conducting the trials. To prepare the lice for the tests, 10±1 lice were placed in a 2 ml micro-centrifuge tube. Some dog hair also was placed in each tube (approximately 10-15 strands of hair). Each louse was checked for viability before being placed into the tube. The louse was considered viable if it moved.

Assessment of Viability

In all Trials, efficacy was assessed by determining if the lice were viable (dead or alive). A louse was classified as alive if it was moving or if the legs moved. Still lice were prodded with forceps to encourage movement.

TABLE 1 overview of compositions and compounds thereof (in weight %) applied in the present experiment

| No | cyclo-methicone | C13-C15 hydro carbons | dimethicone (60000 CS) | dimethicone (100 CS) | Quaternary silicone polymer | C15-C19 hydro carbons |
|---|---|---|---|---|---|---|
| 1 | 100 | | | | | |
| 2 | | 96 | 4 | | | |
| 3 | | 80 | 20 | | | |
| 4 | | 50 | | 50 | | |
| 5 | 100 | | | | | |
| 6a | 95 | 4 | | | 1 | |
| 6b | 79 | 20 | | | 1 | |
| 6c | 49.5 | | | 49.5 | 1 | |
| 9 | | | | | | 100 |
| 11 | | 4 | | | | 96 |

Trial 1

After placing the lice into the micro-centrifuge tube, 2 ml of the test composition, water, or control was placed into the tube using a pipette. After approximately 30 sec (run 1) or 10 sec (run 2), the tube was inverted and the contents poured into a Petri dish lined with filter paper. The lice were immediately removed and placed into a clean Petri dish with filter paper and assessed for viability. After this assessment, the lice were left on the filter paper for up to 1 h and rechecked for viability. In both runs the test items were: water, active control and compositions 1, 2, 3, and 4.

Trial 2

Trial 2 was identical to Trial 1, run 2 with the following difference. After inverting the tube and pouring the contents into a Petri dish lined with filter paper, the lice were moved to fresh filter paper and washed with approximately 2 ml of water. The lice were then moved into a clean Petri dish with filter paper and assessed for viability. After this assessment, the lice were left on the filter paper for approximately 1 h and rechecked for viability. The test items in this trial were: water, active control and compositions 5, 6a, 6b, and 6c.

Trial 3

In Trial 3, 1 ml of the test composition, water, or control was placed onto filter paper. Excess liquid was shaken off the paper so that the paper was saturated but there was no pooling of liquid. The paper was then placed into a Petri dish. The lice in the micro-centrifuge tubes were poured onto the filter paper and assessed for viability every minute from 2 minutes to 10 minutes. The time at which at least no more than 1 louse was alive was recorded and the time when all lice were dead was recorded. If not all lice had died after 10 min, the number of alive lice was recorded after 1 h. The test items in Trial 3 were: water, active control and compositions 1, 2, 3, 4, 5, 6a, 6b, and 6c.

Trial 4

Trial 4 was identical to Trial 3. However, all samples were run in duplicate. In addition, the number of dead lice was recorded every minute from 1 min to 10 min. The test items in Trial 4 were: water, active control and compositions 2, 5, 9 and 11.

Results

In the runs of Trial 1 ten lice were used. For all test compositions and the active control all lice were considered dead immediately after exposure. All lice in the water control were alive. One hour later, no lice in the test and active control treatments had recovered and all lice in the water control were still alive.

In Trial 2, the following number of lice was used (Table 2):

TABLE 2

| | Number of lice | |
|---|---|---|
| | Replicate 1 | Replicate 2 |
| Water | 10 | 11 |
| active control | 11 | 10 |
| composition 5 | 11 | 9 |
| composition 6a | 10 | 9 |
| composition 6b | 9 | 10 |
| composition 6c | 11 | 9 |

As in Trial 1, all lice exposed to the test compositions and the active control were considered dead immediately after exposure. All lice in the water control were alive. One hour later, no lice in the test and active control treatments had recovered and all lice in the water control were still alive.

Results for Trial 3 are presented in table 3.

TABLE 3

| | Number of lice | Time 1 (1 alive)[1] | Time 2 (all dead)[1] | 1 h |
|---|---|---|---|---|
| Water[3,5] | 12 | NA[2] | NA | All alive |
| Control | 10 | 10 min | — | 0 alive |
| composition 1[5] | 11 | 2 min | 3 min | 0 alive |
| composition 2[5] | 9 | NA | 3 min | 0 alive |
| composition 3 | 9 | 2 min | 5 min | 0 alive |
| composition 4 | 9 | NA | 7 min | 0 alive |
| composition 5 | 10 | NA | NA[4] | 1 alive |
| composition 6a | 10 | NA | 5 min | 0 alive |
| composition 6b[5] | 10 | 10 min | NA | 0 alive |
| composition 6c | 10 | NA | 3 min | 0 alive |

[1]Time 1 is the time point where no more than 1 louse was still alive. Time 2 was the time where no lice were alive with checks up to 10 min.
[2]NA = not applicable.
[3]Two samples of water were tested. The results for both were the same.
[4]At 10 minutes, 5 were still alive.
[5]These samples were run in duplicates In some cases all lice died between checks and there was no time point in which one louse still lived (e.g., sample 2, 6a, and 6c). Results for Trial 4 are presented in Table 4.

TABLE 4

| | Number of lice | Number dead (time in minutes) | | | | | | | | | | |
|---|---|---|---|---|---|---|---|---|---|---|---|---|
| | | 1 | 2 | 3 | 4 | 5 | 6 | 7 | 8 | 9 | 10 | 1 h |
| Water (1) | 11 | 0 | 0 | 0 | 0 | 0 | 0 | 0 | 0 | 0 | 0 | All alive |
| Water (2) | 9 | 0 | 0 | 0 | 0 | 0 | 0 | 0 | 0 | 0 | 0 | All alive |
| Control (1) | 9 | 9 | — | — | — | — | — | — | — | — | — | 0 alive |
| Control (2) | 10 | 6 | 9 | 10 | — | — | — | — | — | — | — | |
| composition 2 (1) | 9 | 8 | 9 | — | — | — | — | — | — | — | — | 0 alive |
| composition 2 (2) | 10 | 7 | 10 | — | — | — | — | — | — | — | — | 0 alive |
| composition 5 (1) | 9 | 3 | 4 | 8 | 9 | — | — | — | — | — | — | 0 alive |
| composition 5 (2) | 10 | 3 | 5 | 7 | 7 | 9 | 9 | 9 | 9 | 9 | 9 | 0 alive |
| composition 9 (1) | 10 | 10 | — | — | — | — | — | — | — | — | — | 1 alive |
| composition 9 (2) | 10 | 6 | 7 | 7 | 10 | — | — | — | — | — | — | — |
| composition 11 (1) | 9 | 6 | 9 | — | — | — | — | — | — | — | — | 0 alive |
| composition 11 (2) | 9 | 9 | — | — | — | — | — | — | — | — | — | 0 alive |

Figure 2:
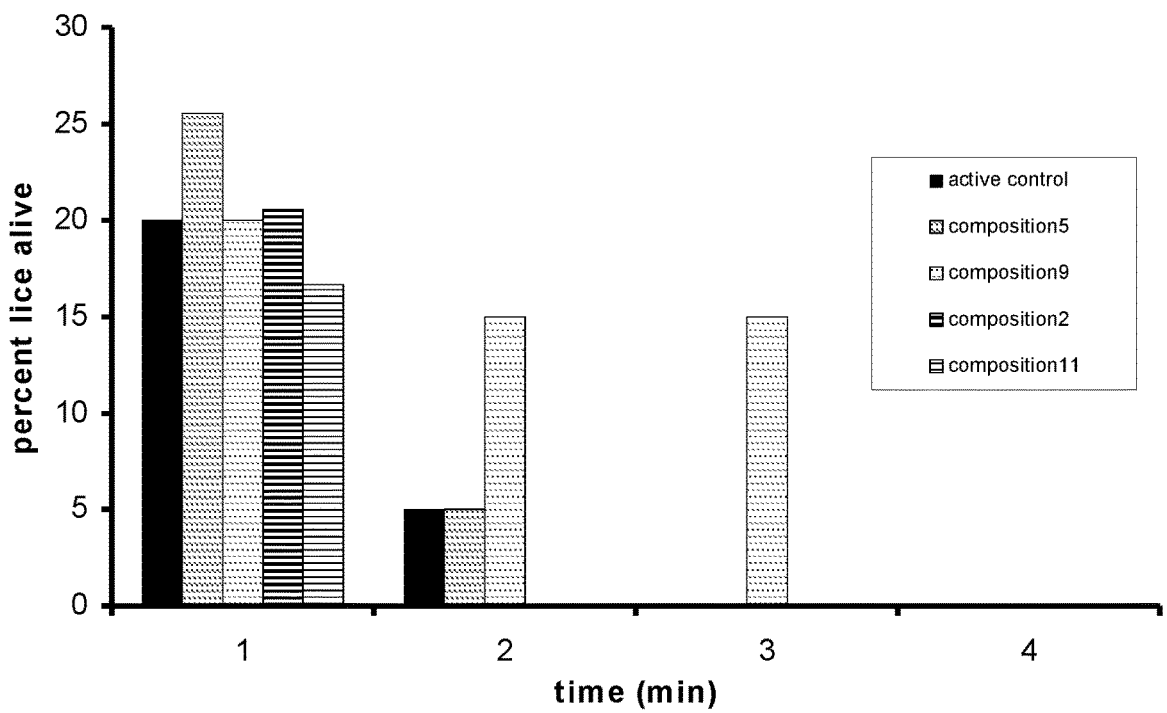
FIG. 2 compares the efficacy of different composition according the present invention with controls and compositions known in the art. In particular

The order in which the samples were done was: water, control, 9, 11, 2, 5, 9, 11, 2, 5, control, water. FIGS. 1 and 2 respectively illustrate the absolute and relative effects of tested compositions compared to controls (water and active controls) for trial 4.

DISCUSSION

All test compositions and the active control were effective against the lice in the submergence test (Trials 1 and 2). Submergence in water did not impact viability of the lice, so drowning via water exposure was not the cause of death. The tested compositions showed a similar efficacy as the active control in Trials 1 and 2.

All test compositions and the active control, demonstrated efficacy against lice in the contact test (Trials 3 and 4). In the contact test, some differences can be explained by viscosity of the composition. For example, with compositions 5 and 9, the lice were able to walk on the filter paper for a period of time, while with other compositions (e.g., 2 and 11) the lice stopped walking immediately. In addition, true contact time was less than indicated if the louse was attached to a hair. Specifically, if a louse was attached to a hair and the liquid did not travel up the hair, the louse was able to avoid contact for a period of time. To decrease this, all hairs were pushed against the filter paper with forceps. However, this resulted in a delay of contact of up to 1 minute.

In Trial 3, all compositions, except composition 5, showed high efficacy against lice. Some differences could be seen in the quickness of activity. Compositions 1, 2, and 6c demonstrated the fastest activity and composition 6b and the control demonstrated the slowest activity.

From Trial 4 (see also FIG. 1-2), it can be observed that the active control, compositions 2 and 11, consisting of a combination of hydrocarbons and a linear siloxane, showed more rapid effects against the lice compared to composition comprising hydrocarbons, but no siloxane.

From this experiment, it can be concluded that compositions comprising linear hydrocarbons as used herein show effect against lice and are able to kill lice. In addition, compositions comprising a combination of linear hydrocarbons and a linear siloxane as used herein provided better results, quicker killing effect on the lice and higher number of lice killed, compared to composition comprising only hydrocarbons. Furthermore, compositions according to the invention comprising linear hydrocarbons and a linear siloxane showed parasite killing effect comparable to an active control known in the art.

Example 2: In Vitro Screening of Compositions According to the Present Invention for Efficacy Against Lice Using Contact Tests This experiment is similar to trial 3 and 4 of example 1, using a non-active control (water), an active control, a composition according to the invention, olive oil produced according to the British Pharmacopeia and two prior art compositions, a first one with neem oil as active ingredient (Bioforce Neemcare Riddance) and a second one with permethrin as active ingredient (Lyclear creame rinse, with 1% permethrin). The screened compositions all have an impact on the breathing mechanism of lice. A composition according to the invention comprises 4 wt % dimethicone 60000 censtistokes at 25° C., 48 wt % $C_{13}$-$C_{15}$ hydrocarbons and 48 wt % $C_{15}$-$C_{19}$ hydrocarbons. The active control consisted of a composition comprising 96 wt % of cyclomethicone and 4 wt % of dimethicone (60000 censtistokes at 25° C.), but no hydrocarbons. Results for this trial are presented in TABLE 5.

TABLE 5

| | Number of lice | Number dead (time in minutes) | | | | | | | | | | |
|---|---|---|---|---|---|---|---|---|---|---|---|---|
| | | 1 | 2 | 3 | 4 | 5 | 6 | 7 | 8 | 9 | 10 | 1 h |
| Water (1) | 10 | 0 | 0 | 0 | 0 | 0 | 0 | 0 | 0 | 0 | 0 | All alive |
| Water (2) | 11 | 0 | 0 | 0 | 0 | 0 | 0 | 0 | 0 | 0 | 0 | All alive |
| Active control (1) | 10 | 8 | 9 | 10 | 10 | — | — | — | — | — | — | 0 alive |
| Active control (2) | 10 | 7 | 9 | 10 | — | — | — | — | — | — | — | 0 alive |
| Composition according to the invention | 9 | 8 | 9 | — | — | — | — | — | — | — | — | 0 alive |
| Olive oil (1) | 9 | 0 | 0 | 5 | 5 | 5 | 5 | 5 | 5 | 5 | 5 | 4 alive |
| Olive oil (2) | 11 | 0 | 0 | 1 | 1 | 1 | 1 | 2 | 2 | 2 | 2 | 9 alive |

TABLE 5-continued

| | Number of lice | Number dead (time in minutes) | | | | | | | | | | |
|---|---|---|---|---|---|---|---|---|---|---|---|---|
| | | 1 | 2 | 3 | 4 | 5 | 6 | 7 | 8 | 9 | 10 | 1 h |
| First prior art composition | 10 | 8 | 8 | 9 | 10 | — | — | — | — | — | — | 0 alive |
| Second prior art composition | 11 | 0 | 0 | 4 | 4 | 6 | 7 | 8 | 8 | 8 | 8 | 3 alive |

Figure 3:
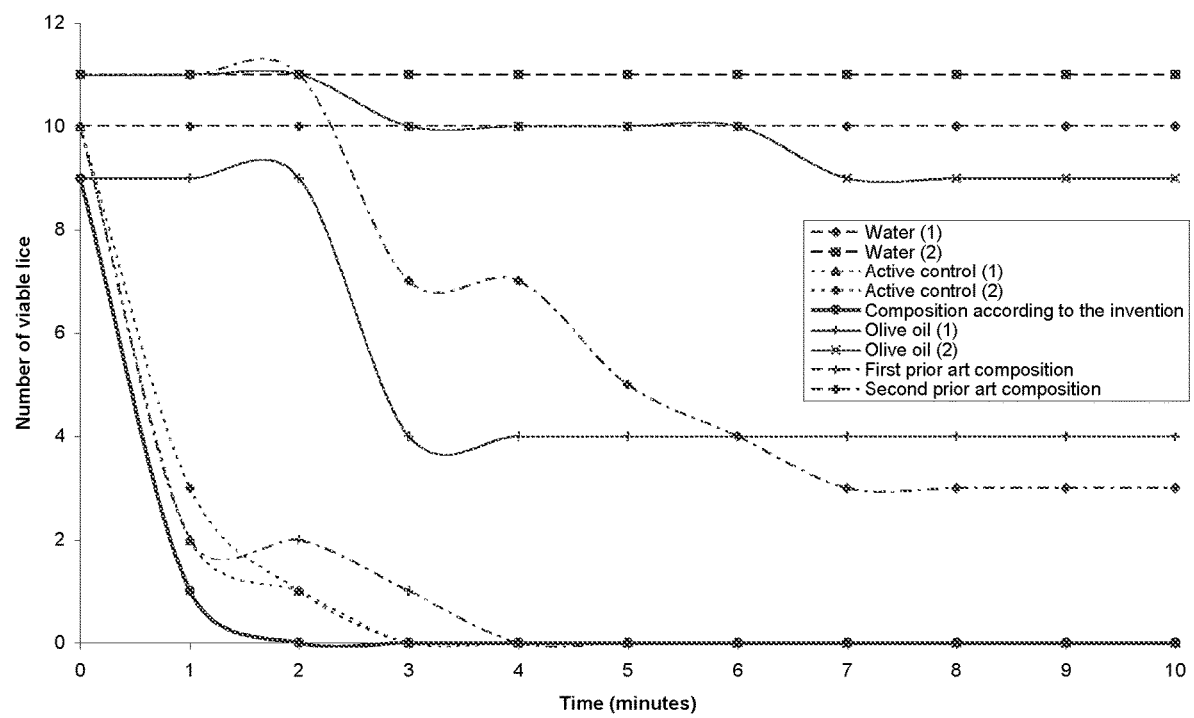
FIG. 3 compares the efficacy of different compositions according the present invention with controls and compositions known in the prior art.

A composition according to the invention, the active controls (2 experiments) and a first prior art composition were all effective against the lice in the contact test, and showed rapid killing of living lice. Results of this trial (see also FIG. 3) clearly show that active controls (both experiments), a first prior art composition and a composition according to the invention rapidly killed living lice compared to a second prior art composition and olive oil. FIG. 3 illustrates the absolute effects of the tested compositions compared to controls (water and active controls) this trial.

From this experiment it can be concluded that a composition according to the invention comprising a combination of linear hydrocarbons and a linear siloxane, provides better results, in particular a quicker killing effect on lice and a higher number of killed lice, compared to prior art compositions. Furthermore, a composition according to the invention showed a two times faster killing effect compared to prior art compositions.

Example 3: Evaluation of the Foaming Capabilities of a Series of Compositions According to the Present Invention In this experiment, a series of compositions according to the invention were screened with respect to their foaming capabilities. The used compositions are depicted in TABLE 6. To assess the foaming capabilities of the compositions a container was filled with the composition. A foam pump was attached to the container and the device was shaken. After this the number of dispenser strokes needed to obtain a volume of 0.04 liter of foam was determined. The foaming capabilities can be assessed in this way since a maximum volume of foam should be obtained with a minimal number of strokes. A poorer foam quality is indicated by a high number of strokes necessary to obtain the volume.

TABLE 6

Overview of compositions according to the invention and compounds thereof (in weight %) applied in the present experiment

| N° | Dimethicone (3CS) | dimethicone (60000 CS) | dimethicone (100,000 CS) | $C_6$ | $C_8$ | $C_{10}$ | $C_{11}$ | $C_{12}$ | Isododecane | $C_{13}$ | $C_{14}$ | $C_{15}$ | $C_{16}$ | Foaming capability |
|---|---|---|---|---|---|---|---|---|---|---|---|---|---|---|
| 1 | 96 | 4 | | | | | | | | | | | | − |
| 2 | | 4 | | | | | | | 96 | | | | | − |
| 3 | | 4 | | 96 | | | | | 96 | | | | | − |
| 4 | | 4 | | | 96 | | | | | | | | | − |
| 5 | | 4 | | | | 96 | | | | | | | | − |
| 6 | | | | | | | 96 | | | | | | | + |
| 7 | | 4 | | | | | | 96 | | | | | | + |
| 8 | | 4 | | | | | | | | 96 | | | | + |
| 9 | | 4 | | | | | | | | | 96 | | | + |
| 10 | | 4 | | | | | | | | | | 96 | | + |
| 11 | | 4 | | | | | | | | | | | 96 | − |
| 12 | | | 4 | | | | | 96 | | | | | | + |
| 13 | | | 4 | | | | | | | 96 | | | | + |
| 14 | | | 4 | | | | | | | | 96 | | | + |
| 15 | | | 4 | | | | | | | | | 96 | | + |
| 16 | | | 4 | | | | | | | | | | 96 | − |

"+" indicates capability of forming stabile foam
"−" indicates no foam production Compositions 6, 7, 8, 9, 10, 12, 13, 14 and 15 formed a stabile foam as defined herein. Unstable foam was obtained with compositions 2, 3, 4, 5, 11, and 16. For composition 1 no foam generation occurred. The experiment showed that hydrocarbons are necessary to obtain foam since composition 1 did not generate any foam. The lowest number of strokes necessary to obtain a volume of 0.04 liter were observed for compositions containing either $C_{11}$, $C_{12}$, $C_{13}$, $C_{14}$ or $C_{15}$ hydrocarbons, while for compositions containing $C_6$, $C_8$, $C_{10}$, or $C_{16}$ hydrocarbons a large number of strokes were necessary to obtain a volume of 0.04 liter and insufficient foam was obtained. Additionally the foam generated for compositions containing $C_6$, $C_8$, $C_{10}$ $C_{16}$ hydrocarbons was unstable and therefore not suited for application.

Furthermore, results indicate that the use of branched hydrocarbons in a composition according to the invention (e.g. composition 2) generate less foam. Foams generated from compositions containing $C_{11}$, $C_{12}$, $C_{13}$, $C_{14}$ or $C_{15}$ hydrocarbons and dimethicone also remained stable for a period as defined herein which is long enough to sufficiently apply the foam on the area to be treated.

Example 4: In Vivo Experiment Assessing the Curing Rate of a Composition

In this experiment, a human trial was conducted to assess the effectiveness of a composition according to the invention. A composition according to the invention comprising 4 wt % dimethicone 60000 censtistokes at 25° C., 6 wt % $C_{10}$-$C_{15}$ hydrocarbons and 90 wt % $C_{16}$-$C_{25}$ hydrocarbons and a prior art composition with permethrin as active ingredient (NIX, 1% permethrin) were screened.

During the trial a total number of 30 patients with head lice were treated, 15 patients with a composition according to the invention and 15 patients with the prior art composition. The trial consisted of two consecutive treatments with the compositions the second treatment taking place 7 days after the first treatment. To determine the effectiveness of the treatment the number of lice and nymphs alive were counted on four time points: on day 1 before the treatment (time point 1), on day 1 after the first treatment (time point 2), on day 7 before the second treatment (time point 3) and on day 7 after the second treatment (time point 4). Cure rates were then calculated as the percentage of persons free of living lice in each group. Complete eradication was assumed when no living lice or nymphs were found on the patient. Results for this trial are presented in TABLE 7.

TABLE 7

| Composition | Time point 1 | Time point 2 | Time point 3 |
|---|---|---|---|
| Prior art composition | 27% | 33% | 73% |
| Composition according to the invention | 100% | 76% | 100% |

This experiment showed that effectiveness of a composition according to this invention is much better than treatment with a prior art composition. After a first treatment no live lice were obtained on patients treated with a composition according to the invention while in patients treated with a prior art composition only 27% showed no occurrence of live lice. On time point 2, 76% showed no occurrence of living lice when treated with a composition according to the invention, while only 33% showed no occurrence of living lice when treated with a prior art composition. From these results it is clear that after a first treatment efficacy of a composition according to the present invention is much higher than that of a prior art composition, as a cure rate of 76% can be obtained.

After a second treatment no living lice were obtained on patients treated with a composition according to the invention while in patients treated with a prior art composition 73% showed no occurrence of live lice.

Moreover, a cure rate of 76% at the second time point in the group treated with a composition according to the invention further inherently indicates that the present composition has ovicidal activity, and enables to effectively kill nits.

Compared to a prior art composition, a composition according to the invention shows a better efficiency: a higher and faster killing rate and higher killing efficiency is obtained with a composition according to the invention. In this example on a short term, immediately after the treatment a composition according to the invention showed a four times more effective killing of live lice compared to a prior art composition, while on the long term, several days after the treatment a two to three times more effective treatment was obtained with a composition according to the invention.

Example 5: Preferred Examples of Compositions According to the Invention

The following examples illustrate several embodiments of compositions according to the invention.

A first composition comprises:

A) 2-6 wt % dimethicone, more preferably about 4 wt. % dimethicone, for instance of 20,000, 40000, 60000 or 80,000 censtistokes at 25° C., and preferably of 60000 or 80,000 censtistokes at 25° C., and B) 65 to 96 wt % of a mixture of saturated linear or branched hydrocarbons selected form the group consisting of $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$, $C_{24}$ and $C_{25}$ hydrocarbons, and preferably from 0.0 to 15.0% by weight $C_{10}$, $C_{11}$, $C_{12}$, $C_{13}$, $C_{14}$, and/or $C_{15}$ hydrocarbons, preferably from 0.0 to 10.0% by weight $C_{10}$, $C_{11}$, $C_{12}$, $C_{13}$, $C_{14}$, and/or $C_{15}$ hydrocarbons and more preferably less than 9.0% by weight $C_{10}$, $C_{11}$, $C_{12}$, $C_{13}$, $C_{14}$, and/or $C_{15}$ hydrocarbons, and more preferably less than 8.0% by weight $C_{10}$, $C_{11}$, $C_{12}$, $C_{13}$, $C_{14}$, and/or $C_{15}$ hydrocarbons, and more preferably less than 7.0% by weight $C_{10}$, $C_{11}$, $C_{12}$, $C_{13}$, $C_{14}$, and/or $C_{15}$ hydrocarbons, and more preferably less than 6.0% by weight $C_{10}$, $C_{11}$, $C_{12}$, $C_{13}$, $C_{14}$, and/or $C_{15}$ hydrocarbons, and more preferably less than 5.0% by weight $C_{10}$, $C_{11}$, $C_{12}$, $C_{13}$, $C_{14}$, and/or $C_{15}$ hydrocarbons, and more preferably less than 4.0% by weight $C_{10}$, $C_{11}$, $C_{12}$, $C_{13}$, $C_{14}$, and/or $C_{15}$ hydrocarbons, and more preferably less than 3.0% by weight $C_{10}$, $C_{11}$, $C_{12}$, $C_{13}$, $C_{14}$, and/or $C_{15}$ hydrocarbons, and more preferably less than 2.5% by weight $C_{10}$, $C_{11}$, $C_{12}$, $C_{13}$, $C_{14}$, and/or $C_{15}$ hydrocarbons, and most preferably less than 2% by weight $C_{10}$, $C_{11}$, $C_{12}$, $C_{13}$, $C_{14}$, and/or $C_{15}$ hydrocarbons, and from 0 to 20% by weight $C_{16}$ hydrocarbons, preferably from 1 to 15% by weight $C_{16}$ hydrocarbons and more preferably from 1 to 10% by weight $C_{16}$ hydrocarbons, more preferably from 2 to 8% by weight $C_{16}$ hydrocarbons, more preferably from 3 to 7% by weight $C_{16}$ hydrocarbons, more preferably about 5% by weight $C_{16}$ hydrocarbons, from 0 to 30% by weight $C_{17}$ hydrocarbons, preferably from 1 to 20% by weight $C_{17}$ hydrocarbons and more preferably from 5 to 15% by weight $C_{17}$ hydrocarbons, most preferably about 10% by weight $C_{17}$ hydrocarbons, from 0 to 30% by weight $C_{18}$ hydrocarbons, preferably from 1 to 20% by weight $C_{18}$ hydrocarbons and more preferably from 5 to 15% by weight $C_{18}$ hydrocarbons, most preferably about 12% by weight $C_{18}$ hydrocarbons, from 0 to 30% by weight $C_{19}$ hydrocarbons, preferably from 1 to 20% by weight $C_{19}$ hydrocarbons and more preferably from 5 to 20% by weight $C_{19}$ hydrocarbons, and/or more preferably from 10 to 20% by weight $C_{19}$ hydrocarbons, most preferably about 16% by weight $C_{19}$ hydrocarbons, from 0 to 70% by weight $C_{20+}$ hydrocarbons, preferably from 20 to 65% by weight $C_{20+}$ hydrocarbons and more preferably from 30 to 60% by weight $C_{20+}$ hydrocarbons, and more preferably from 40 to 60% by weight $C_{20+}$ hydrocarbons, most preferably about 55% by weight $C_{20+}$ hydrocarbons C) optionally between 0.1 wt % and 2 wt % of a quaternary silicone co-polymer, whereby said weight % is based on the composition.

Another preferred composition according to the invention consists of 4 wt % dimethicone of 60,000 cenistokes at 25° C., and a remaining fraction which comprises saturated linear or branched hydrocarbons, and in particular less than 0.1 wt % $C_{10}$, less than 0.1 wt % $C_{11}$, less than 0.1 wt % $C_{12}$, less than 0.1 wt % $C_{13}$, 0.5 wt % $C_{14}$, 1.7 wt % $C_{15}$, 3.7 wt % $C_{16}$, 7.6 wt % $C_{17}$, 9.9 wt % $C_{18}$, 16.9 wt % $C_{19}$, 12.6 wt % $C_{20}$ saturated linear and/or branched hydrocarbons, 10.6 wt % $C_{21}$ saturated linear and/or branched hydrocarbons, 10.2% $C_{22}$ saturated linear and/or branched hydrocarbons, 21.9% $C_{23+}$ saturated linear and/or branched hydrocarbons whereby said weight % is based on the composition.

Example 6: In Vitro Evaluation of a Composition According to the Present Invention for Efficacy Against *Pediculus* Nits Using a Dip Test In this experiment, ten nits were dipped for 15 minutes in a composition according to the present invention and placed in an incubator suitable to hatch the nits. Hatching was monitored daily during 15 days. Of the ten dipped nits no nits hatched after exposure to the composition, demonstrating an ovicidal efficacy of about 100%.

Example 7

In this experiment, a series of compositions consisting of 96 wt. % hydrocarbons and 4 wt. % dimethicone (60 000 CS) were tested for skin sensitivity and irritation. These compositions received a score of 0 (no irritation noted) to 4 (maximal irritation) on live piglets. The compositions were also tested for rinsability. The results are shown in Table 8.

TABLE 8

| N° | dimethicone (60000 CS) | $C_{12-}$ | $C_{13}$ | $C_{14}$ | $C_{15}$ | $C_{16}$ | $C_{17}$ | $C_{18}$ | $C_{19}$ | $C_{20}$ | $C_{21}$ | $C_{22}$ | $C_{23+}$ | Irritation Score | Spreadability & Rinsabillity |
|---|---|---|---|---|---|---|---|---|---|---|---|---|---|---|---|
| 17 | 4 | <,1 | 0,1 | 0,5 | 1,7 | 3,7 | 7,6 | 9,9 | 17,9 | 12,6 | 11,6 | 11,2 | 19,1 | 0 | + |
| 18 | 4 | 2,0 | 15,2 | 37,6 | 25,4 | 9,4 | 6,6 | 0,8 | 0,7 | 0,3 | 0 | 0 | 0 | 3 | + |
| 19 | 4 | <,1 | 0,1 | 3,5 | 8,9 | 18,7 | 27,4 | 21,4 | 11,2 | 4,0 | 0,5 | 0,2 | 0 | 2 | + |
| 20 | 4 | 0,7 | 0,4 | 0,7 | 1,2 | 7,8 | 13,2 | 11,6 | 13,8 | 25,2 | 9,8 | 4,7 | 6,9 | 0 | + |
| 21 | 4 | <,1 | <,1 | <,1 | 0,1 | 0,1 | 0,5 | 3,5 | 10,2 | 19,8 | 28,6 | 22,3 | 10,6 | 0 | − |
| 22 | 4 | 48 | 0 | 48 | 0 | 0 | 0 | 0 | 0 | 0 | 0 | 0 | 0 | 4 | + |
| 24 | 4 | 0 | 0 | 48 | 0 | 48 | 0 | 0 | 0 | 0 | 0 | 0 | 0 | 3 | + |
| 25 | 4 | 0 | 0 | 0 | 0 | 48 | 0 | 48 | 0 | 0 | 0 | 0 | 0 | 1 | − |
| 26 | 4 | 0 | 0 | 0 | 0 | 0 | 0 | 48 | 0 | 48 | 0 | 0 | 0 | 0 | − |

"+" indicates capability of applying and subsequently rinsing said composition from both hair and scalp.
"−" indicates issues with applying or removing said composition.

This experiment showed that effectiveness of a composition according to this invention is much better than a composition consisting of 96 wt. % hydrocarbons and 4% dimethicone falling outside the scope of the present invention.

From this experiment it is clear that only compositions with a hydrocarbon mixture according to the present invention (composition 17 and 20) has the combination of low irritation and sufficiently high rinsability. Hydrocarbon mixtures with too much low molecular weight hydrocarbons ($C_{16}$) have issues with skin irritation and sensitivity. Hydrocarbon mixtures with too much high molecular weight hydrocarbons ($C_{18}$+) have issues with rinsability and/or skin irritation issues. In particular, compositions which comprise high molecular weight dimethicone and high molecular weight hydrocarbon mixtures are increasingly difficult to spread evenly onto a scalp and into hair, as well as remove adequately from said scalp and/or hair.

The invention claimed is:

1. A composition for killing arthropods, said composition comprising at least 65% by weight of a mixture of saturated linear or branched hydrocarbons, wherein said hydrocarbons comprise a mixture of saturated linear or branched $C_{10}$-$C_{16}$ hydrocarbons and saturated linear or branched $C_{17}$-$C_{25}$ hydrocarbons, wherein the ratio of saturated linear or branched $C_{10}$-$C_{16}$ hydrocarbons to saturated linear or branched $C_{17}$-$C_{25}$ hydrocarbons by weight is lower than 15:85, the composition comprises between 6.9% and 21.9% of $C_{23+}$ by weight.

2. The composition according to claim 1, said composition further comprising between 0.01 and 10% by weight of dimethicone having a viscosity of at least 20000 centistokes at 25° C.

3. The composition according to claim 1, wherein the ratio of saturated linear or branched $C_{10}$-$C_{16}$ hydrocarbons to saturated linear or branched $C_{17}$-$C_{25}$ hydrocarbons by weight is lower than 10:90.

4. The composition according to claim 1, wherein the ratio of saturated linear or branched $C_{10}$-$C_{16}$ hydrocarbons to saturated linear or branched $C_{17}$-$C_{25}$ hydrocarbons by weight is lower than 5:95.

5. The composition according to claim 1, wherein said hydrocarbons comprise a mixture of saturated linear or branched $C_{10}$-$C_{15}$ hydrocarbons and saturated linear or branched $C_{16}$-$C_{19}$ hydrocarbons, whereby the ratio of saturated linear or branched $C_{10}$-$C_{15}$ hydrocarbons to saturated linear or branched $C_{16}$-$C_{19}$ hydrocarbons by weight is between 1:100 and 1:10.

6. The composition according to claim 1, whereby the ratio of saturated linear or branched $C_{10}$-$C_{15}$ hydrocarbons to saturated linear or branched $C_{16}$-$C_{19}$ hydrocarbons by weight is 1:20.

7. The composition according to claim 1, wherein said hydrocarbons comprise a mixture of saturated linear hydrocarbons and saturated branched hydrocarbons, whereby the ratio of saturated linear hydrocarbons to saturated branched hydrocarbons is between 1:4 and 1:2.

8. The composition according to claim 1, wherein said arthropod is an insect or an arachnid.

9. The composition according to claim 1, whereby a killing efficiency for said arthropods is obtained of at least 70%.

10. The composition according to claim 1, whereby a cure-rate is obtained of at least 70%.

11. The composition according to claim 1 for killing arthropod eggs.

12. The composition according to claim 11, whereby a killing efficiency for said arthropod eggs is obtained of at least 70%.

13. A hair product for killing arthropods and arthropod eggs, wherein said arthropod is an insect or an arachnid comprising a composition as defined in claim 1.

14. A method for killing arthropods and arthropod eggs, wherein said arthropod is an insect or an arachnid, which comprises applying to said arthropod and said arthropod egg a composition as defined in claim 1 or a hair product wherein said arthropod is an insect or an arachnid, comprising a composition as defined in claim 1.

15. The method according to claim 14, for killing arthropods and arthropod eggs whereby said arthropods and arthropod eggs are killed at a killing efficiency for said arthropods of at least 70, and for said arthropod of at least 70%.

16. A composition for killing arthropods, said composition comprising at least 65% by weight of a mixture of saturated linear or branched hydrocarbons, wherein said hydrocarbons comprise a mixture of saturated linear or branched $C_{10}$-$C_{25}$ hydrocarbons in an amount of:

Between less than 0.1 to 0.7 wt % t $C_{10-12}$;
Between 0.1 and 0.4 wt % $C_{13}$;
Between 0.5 and 0.7 wt % $C_{14}$;
Between 1.2 and 1.7 wt % $C_{15}$;
Between 3.7 and 7.8 wt % $C_{16}$;
Between 7.6 and 13.2 wt % $C_{17}$;
Between 9.9 and 11.6 wt % $C_{18}$;
Between 13.8 and 17.9 wt % $C_{19}$;
Between 12.6 and 25.2 wt % $C_{20}$;
Between 9.8 and 11.6 wt % $C_{21}$;
Between 4.7 and 11.2 wt % $C_{22}$; and
Between 6.9 and 19.1 wt % $C_{23+}$.

17. A composition for killing arthropods, said composition comprising at least 65% by weight of a mixture of saturated linear or branched hydrocarbons, wherein said hydrocarbons comprise a mixture of saturated linear or branched $C_{10}$-$C_{25}$ hydrocarbons in an amount of:

Less than 0.1 wt % $C_{10}$;
Less than 0.1 wt % $C_{11}$;
Less than 0.1 wt % $C_{12}$;
Less than 0.1 wt % $C_{13}$;
0.5 wt % $C_{14}$;
1.7 wt % $C_{15}$;
3.7 wt % $C_{16}$;
7.6 wt % $C_{17}$;
9.9 wt % $C_{18}$;
16.9 wt % $C_{19}$;
12.6 wt % $C_{20}$;
10.6 wt % $C_{21}$;
10.2 wt % $C_{22}$; and
21.9% $C_{23+}$.

18. The composition according to claim 8, wherein said arthropod is a sucking or biting louse.

19. The method according to claim 15, wherein said arthropod is a sucking or biting louse.

\* \* \* \* \*